US011824596B2

(12) United States Patent
Nakahira et al.

(10) Patent No.: US 11,824,596 B2
(45) Date of Patent: Nov. 21, 2023

(54) BASE STATION OPERATION TEST METHOD, WIRELESS COMMUNICATION SYSTEM, AND BASE STATION

(71) Applicant: NIPPON TELEGRAPH AND TELEPHONE CORPORATION, Tokyo (JP)

(72) Inventors: Toshiro Nakahira, Musashino (JP); Tomoki Murakami, Musashino (JP); Hirantha Abeysekera, Musashino (JP); Koichi Ishihara, Musashino (JP); Takafumi Hayashi, Musashino (JP); Yasushi Takatori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 213 days.

(21) Appl. No.: 17/603,710

(22) PCT Filed: Apr. 20, 2020

(86) PCT No.: PCT/JP2020/017006
§ 371 (c)(1),
(2) Date: Oct. 14, 2021

(87) PCT Pub. No.: WO2020/218229
PCT Pub. Date: Oct. 29, 2020

(65) Prior Publication Data
US 2022/0239391 A1    Jul. 28, 2022

(30) Foreign Application Priority Data
Apr. 23, 2019 (JP) .................................. 2019-081829

(51) Int. Cl.
*H04B 14/06* (2006.01)
*H04B 17/29* (2015.01)
(Continued)

(52) U.S. Cl.
CPC ............. *H04B 17/29* (2015.01); *H04B 17/16* (2015.01); *H04W 24/06* (2013.01)

(58) Field of Classification Search
CPC . H04L 63/20; H04L 43/0882; H04L 43/0811; H04L 43/50; G06F 19/322;
(Continued)

(56) References Cited

U.S. PATENT DOCUMENTS

2005/0060599 A1* 3/2005 Inami .................. G06F 11/2294
714/E11.173
2017/0024521 A1* 1/2017 Nakamura ............. G16H 50/20
(Continued)

OTHER PUBLICATIONS

Itochu Techno-Solutions Corporation, Cisco Meraki, in-house network is entering an era of centralized management via the cloud!, literature, Feb. 20, 2019 (Reading Day), http://www.ctc-g.co.jp/solutions/cisco_meraki/.

*Primary Examiner* — Khai Tran
(74) *Attorney, Agent, or Firm* — Harness, Dickey & Pierce, P.L.C.

(57) ABSTRACT

An operation test method of a base station to which a plurality of terminal stations are connectable, the method including switching a specific radio communication unit of a plurality of radio communication units to a subordinate mode and setting another radio communication unit of the plurality of radio communication units to a normal mode, the normal mode being a mode in which each of the plurality of radio communication units performs radio communication as a base station, the subordinate mode being a mode in which each of the plurality of radio communication units performs radio communication as a virtual terminal station, each of the plurality of radio communication units being switchable between the normal mode and the subordinate mode, and conducting an operation test of the base station by performing, based on a test policy that sets the operation test,
(Continued)

radio communication between the specific radio communication unit switched to the subordinate mode and the other radio communication unit in the normal mode.

8 Claims, 8 Drawing Sheets

(51) Int. Cl.
*H04B 17/16* (2015.01)
*H04W 24/06* (2009.01)

(58) Field of Classification Search
CPC .... G06F 19/3406; G06Q 50/22; H04B 17/29; H04B 17/16; H04W 84/12
USPC .......................................... 375/244, 260, 267
See application file for complete search history.

(56) References Cited

U.S. PATENT DOCUMENTS

2022/0191248 A1\* 6/2022 Pieczul ............... H04L 63/0227
2022/0352929 A1\* 11/2022 Jang ....................... H04B 17/15

\* cited by examiner

| POLICY NUMBER | TEST DETAILS | NUMBER OF REPETITIONS | DETERMINATION CONDITION | CONDUCT CONDITION | STOP CONDITION |
|---|---|---|---|---|---|
| I | · SET ONE RADIO COMMUNICATION UNIT 21 TO SUBORDINATE MODE<br>· PERFORM RADIO CONNECTION TO ANOTHER RADIO COMMUNICATION UNIT 21 | THREE TIMES | COMMUNICATION IS ESTABLISHED FOR TEN SECONDS OR SHORTER | · TRAFFIC OF BASE STATION 2 IN PAST TEN MINUTES IS 1 Mbyte OR SMALLER<br>· NO TEST IS CONDUCTED WITHIN PAST SIX HOURS | · IF TRAFFIC FLOWING DURING TEST IS 1 Mbyte OR MORE |
| II | · SET ONE RADIO COMMUNICATION UNIT 21 TO SUBORDINATE MODE<br>· PERFORM RADIO CONNECTION TO ANOTHER RADIO COMMUNICATION UNIT 21<br>· TRANSMIT DOWNLINK TRAFFIC FOR TEN SECONDS | THREE TIMES | PACKET LOSS RATE OF TRAFFIC IS 1% OR LOWER | · NUMBER OF TERMINAL STATIONS CONNECTED TO BASE STATION 2 IN PAST TEN MINUTES IS ZERO<br>· NO TEST IS CONDUCTED WITHIN PAST 24 HOURS | · IF ONE OR MORE TERMINAL STATIONS ARE CONNECTED DURING TEST OPERATION EXCEPT FOR RADIO COMMUNICATION UNIT 21 IN SUBORDINATE |
| ... | ... | ... | ... | ... | ... |

Fig. 5

| BASE STATION IDENTIFIER | TEST DATE AND TIME | TEST POLICY | TEST RESULT |
|---|---|---|---|
| 1 | 2018/9/5 19:32 | POLICY I | OK |
| 1 | 2018/9/5 20:00 | POLICY II | OK |
| ⋮ | ⋮ | ⋮ | ⋮ |

Fig. 6

BASE STATION OPERATION TEST METHOD, WIRELESS COMMUNICATION SYSTEM, AND BASE STATION

CROSS-REFERENCE TO RELATED APPLICATIONS

This application is a 371 U.S. National Phase of International Application No. PCT/JP2020/017006 filed on Apr. 20, 2020, which claims priority to Japanese Application No. 2019-081829 filed on Apr. 23, 2019. The entire disclosures of the above applications are incorporated herein by reference.

TECHNICAL FIELD

The present invention relates to an operation test method of a base station, a radio communication system and a base station.

BACKGROUND ART

As a high-speed radio access system using radio waves of a license-free band, there is the IEEE 802.11 wireless LAN standard, which specifies various standards such as 11a, 11b, 11g, 11n and 11ac with different radio frequency bands, radio transmission techniques, and radio transmission rates.

The 11b standard is a radio transmission rate of up to 11 Mbps using the 2.4 GHz band. The 11a standard is a radio transmission rate of up to 54 Mbps using the 5 GHz band. The 11 g standard is a radio transmission rate of up to 54 Mbps using the 2.4 GHz band. The 11n standard is a radio transmission rate of up to 600 Mbps utilizing 2.4 and 5 GHz bands. The 11ac standard is a radio transmission rate of up to 6900 Mbps using the 5 GHz band. These various IEEE 802.11 wireless LAN standards are backward compatible and can be used in a mixed environment.

Wireless LAN is widely used not only in homes and offices, but also in public areas such as train stations, airports, and shopping malls, and wireless LAN services attract customers and improve user satisfaction. In such places, area owners expect that the wireless LAN service will continue to be provided without any problems. For this reason, operators of wireless LAN networks are required to check and monitor the operational status of the wireless LAN networks, and may check and monitor the operational status remotely via networks (see, for example, NPTL 1).

CITATION LIST

Non Patent Literature

NPTL 1: Entering an Era of Collective Management of Company Networks via the Cloud!, [online], ITOCHU TECHNO-SOLUTIONS CORPORATION [searched on 2019 Feb. 20], the Internet <URL:http://www.ctc-g.co.jp/solutions/cisco_meraki/>

SUMMARY OF THE INVENTION

Technical Problem

Operators of wireless LAN networks sometimes need to know remotely whether the installed wireless LAN networks are operating without problems. In this case, it is conceivable to check the operation logs of the devices, but some failures and problems may not appear in the operation logs, and therefore the operation logs alone may not be sufficient for confirmation.

To conduct a reliable test of the wireless LAN network, an operator is assumed to use the wireless LAN network in the same conditions as the users. It is conceivable that a measurer conducts an on-site connection test. For example, the measurer operates a terminal station for the test in the service area of the wireless LAN network and makes a radio connection to the base station to be tested to check the connection status. This entails many tasks for the test and many personnel operations.

An object of the present invention is to provide an operation test method of a base station, a radio communication system, and a base station that enable an operation test of the base station without the need for a worker to connect terminal stations on site.

Means for Solving the Problem

An operation test method according to an aspect of the present invention is an operation test method of a base station to which a plurality of terminal stations are connectable, the method including switching a setting of a specific radio communication unit of a plurality of radio communication units to a subordinate mode and setting another radio communication unit of the plurality of radio communication units to a normal mode, the normal mode being a mode in which each of the plurality of radio communication units performs radio communication as a base station, the subordinate mode being a mode in which each of the plurality of radio communication units performs radio communication as a virtual terminal station, each of the plurality of radio communication units being switchable between the normal mode and the subordinate mode, and conducting an operation test of the base station by performing, based on a test policy that sets the operation test, radio communication between the specific radio communication unit in which the setting is switched to the subordinate mode and the other radio communication unit in the normal mode.

In the operation test method of the base station according to an aspect of the present invention, each of the plurality of radio communication units is switchable between the normal mode and the subordinate mode compatible with a plurality of communication standards.

The operation test method of the base station according to an aspect of the present invention further includes calculating the test policy for the base station based on base station performance information representing a performance of the base station, and delivering the calculated test policy to the base station.

The operation test method of the base station according to an aspect of the present invention further includes notifying the base station performance information from the base station to a control station, determining a result of the operation test of the base station, and notifying the determined result of the operation test of the base station from the base station to the control station, wherein the control station calculates the test policy.

A radio communication system according to an aspect of the present invention includes a plurality of base stations and a control station configured to control each of the plurality of base stations, wherein each of the plurality of base stations includes a plurality of radio communication units, each of the plurality of radio communication units being switchable between a normal mode in which the radio communication unit performs radio communication as a base station and a subordinate mode in which the radio communication unit performs radio communication as a virtual terminal station, and a test conduct unit configured to conduct an operation test of the base station based on a test policy that sets the operation test of a case where a specific radio communication unit of the plurality of radio communication units is switched to the subordinate mode and another radio communication unit of the plurality of radio communication units operates in the normal mode, and the control station includes a policy calculation unit configured to calculate the test policy for each of the plurality of base stations based on base station performance information representing a performance of each of the plurality of base stations, and a communication unit configured to deliver the test policy calculated by the policy calculation unit to each of the plurality of base stations.

In the radio communication system according to an aspect of the present invention, each of the plurality of radio communication units is switchable between the normal mode and the subordinate mode compatible with a plurality of communication standards.

A base station according to an aspect of the present invention is a station to which a plurality of terminal stations are connectable, the base station including a plurality of radio communication units, each of the plurality of radio communication units being switchable between a normal mode in which the radio communication unit performs radio communication as a base station and a subordinate mode in which the radio communication unit performs radio communication as a virtual terminal station, and a test conduct unit configured to conduct an operation test of the base station based on a test policy that sets the operation test of a case where a specific radio communication unit of the plurality of radio communication units is switched to the subordinate mode and another radio communication unit of the plurality of radio communication units operates in the normal mode.

In the base station according to an aspect of the present invention, each of the plurality of radio communication units is switchable between the normal mode and the subordinate mode compatible with a plurality of communication standards.

Effects of the Invention

According to the present invention, an operation test of a base station can be conducted without the need for a worker to connect terminal stations on site.

BRIEF DESCRIPTION OF DRAWINGS

FIG. 5 illustrates an exemplary test policy.

FIG. 6 illustrates exemplary test result information.

DESCRIPTION OF EMBODIMENTS

Figure 1:
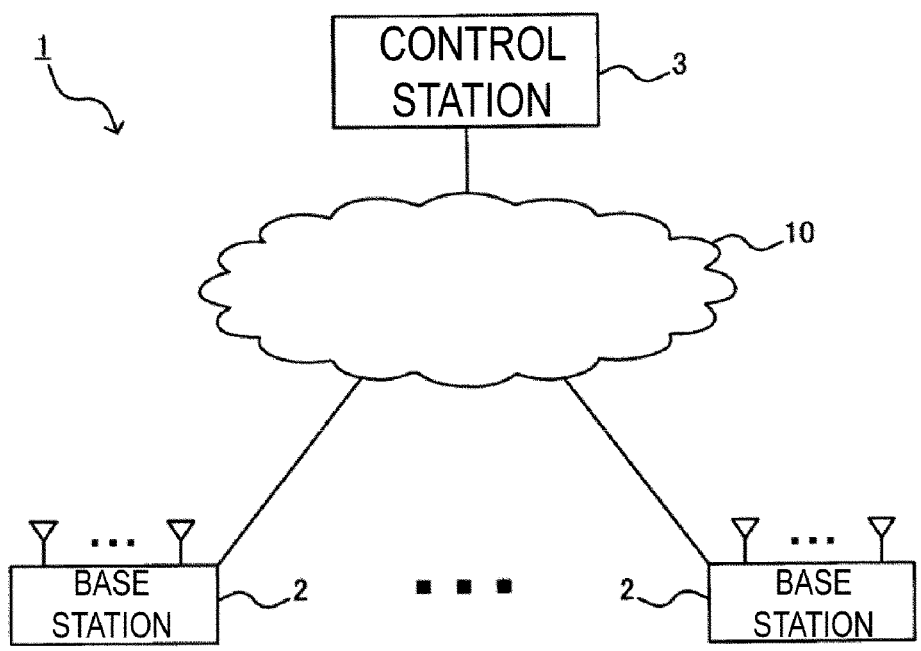
FIG. 1 illustrates an exemplary configuration of a radio communication system according to an embodiment.

An embodiment of a radio communication system is described below with reference to the drawings. FIG. 1 illustrates an exemplary configuration of a radio communication system 1 according to an embodiment. As illustrated in FIG. 1, in the radio communication system 1, for example, a plurality of base stations 2 are connected to a control station 3 through a network 10. In addition, each base station 2 accommodates a plurality of terminal stations (not illustrated) of various communication standards or communication schemes within a service area where radio communication is possible.

Figure 2:
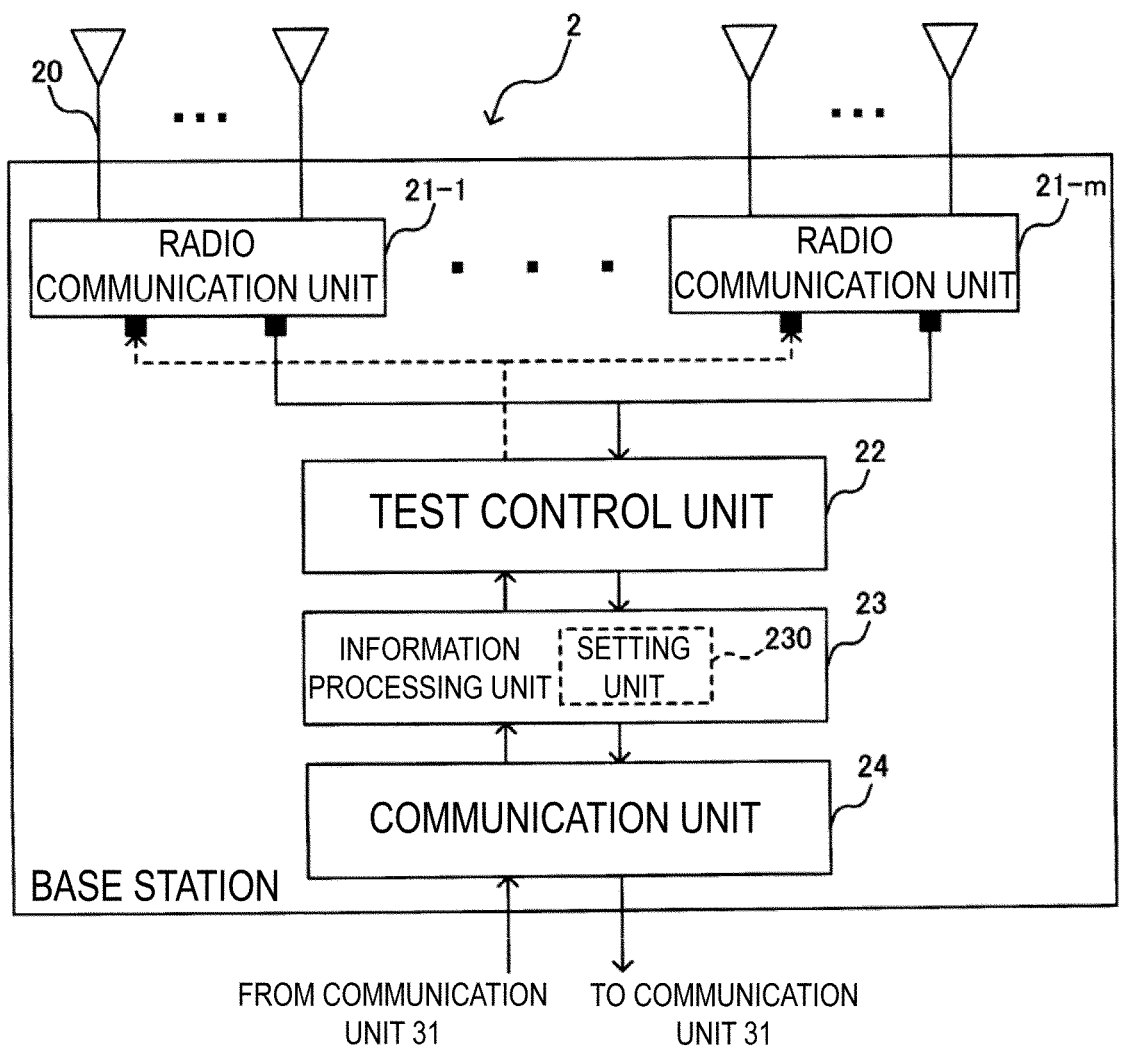
FIG. 2 illustrates an exemplary configuration of a base station according to the embodiment.

FIG. 2 illustrates an exemplary configuration of the base station 2 according to the embodiment. As illustrated in FIG. 2, the base station 2 includes a plurality of antennas 20, m radio communication units 21-1 to 21-*m*, a test control unit 22, an information processing unit 23 including a setting unit 230, and a communication unit 24, for example. It is to be noted that when the plurality of configurations such as the radio communication units 21-1 to 21-*m* is not individually specified, they are simply abbreviated as a radio communication unit 21 or the like. In addition, other function blocks that are provided in typical base stations are not illustrated.

A plurality of the antennas 20 is connected to each of the radio communication units 21-1 to 21-*m*. The antenna 20 transmits radio frames input from the radio communication units 21-1 to 21-*m*, and outputs received radio frames to the radio communication units 21-1 to 21-*m*.

The radio communication units 21-1 to 21-*m* can each independently perform radio communications of wireless LAN and the like with one or more terminal stations through the plurality of the antennas 20, for example. In addition, each of the radio communication units 21-1 to 21-*m* is switchable between a normal mode (base station mode) in which the base station 2 performs radio communication for functioning as a normal base station, and a subordinate mode (terminal station mode) in which the base station 2 performs radio communication as a virtual terminal station.

Further, for example, each of the radio communication units 21-1 to 21-*m* is changeably compatible with various communication standards or communication schemes, and performs radio communication such as transmission and reception of test data for an autonomous operation test in accordance with a set communication standard on the basis of a test policy described later with reference to FIG. 6, and the like. That is, the radio communication units 21-1 to 21-*m* can function as a plurality of virtual terminal stations of different communication standards.

The test control unit 22 bidirectionally inputs and outputs signals to and from each of the radio communication units 21-1 to 21-*m* and the information processing unit 23 to perform a control when the base station 2 performs an operation test.

Figure 3:
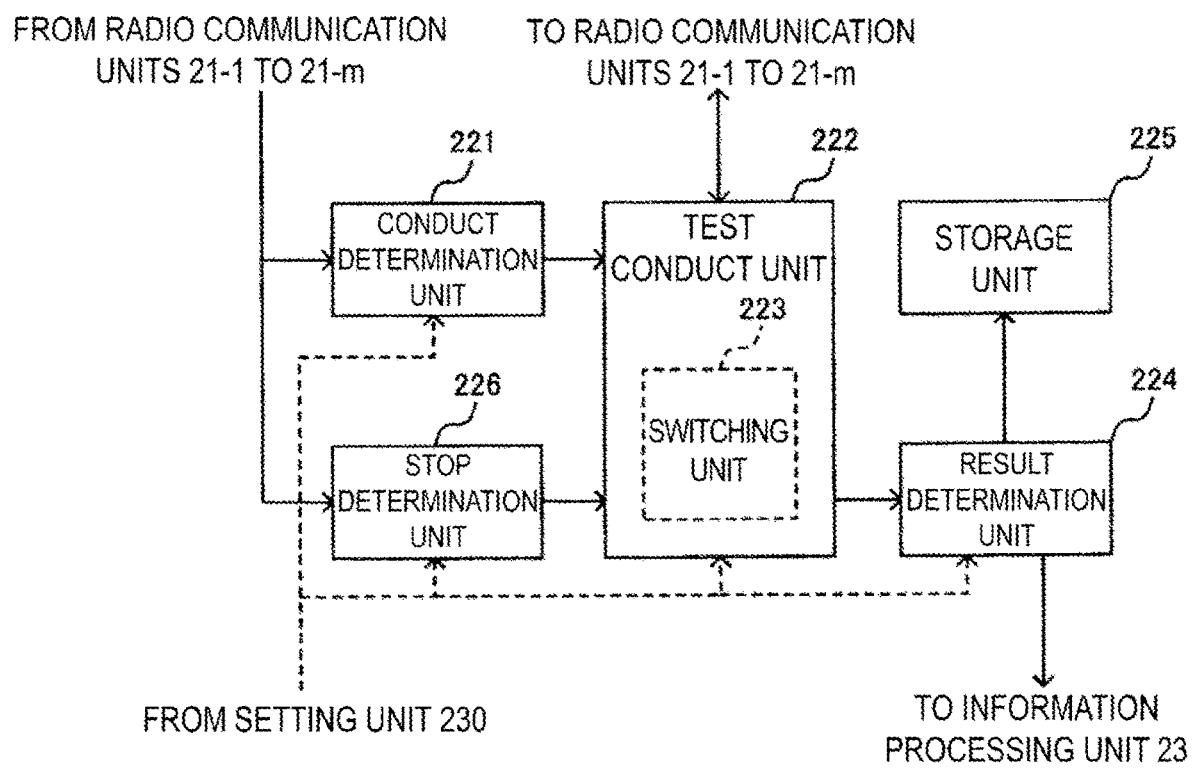
FIG. 3 is a functional block diagram illustrating details of a function of a test control unit.

FIG. 3 illustrates details of a function of the test control unit 22. As illustrated in FIG. 3, the test control unit 22 includes a conduct determination unit 221, a test conduct unit 222, a result determination unit 224, a storage unit 225 and a stop determination unit 226.

On the basis of a test policy set by the setting unit 230 (FIG. 2), the conduct determination unit 221 determines whether the status of the base station 2 satisfies a conduct condition included in the test policy. When the conduct condition is satisfied, the conduct determination unit 221 outputs, to the test conduct unit 222, the policy number in which the conduct condition is employed.

The test conduct unit 222 includes a switching unit 223, and conducts the test of the policy number input from the conduct determination unit 221. For example, the test conduct unit 222 performs a setting based on the test policy on the radio communication units 21-1 to 21-$m$, and, after the switching unit 223 switches a specific radio communication unit 21 to a subordinate mode, the test conduct unit 222 operates another radio communication unit 21 in a normal mode to conduct the operation test of the base station 2.

The result determination unit 224 makes a pass/fail determination on the measurement value of the conducted operation test on the basis of the determination condition in the test policy set by the setting unit 230. The result determination unit 224 stores the determination result of the operation test in the storage unit 225, and outputs the result to the information processing unit 23.

On the basis of a stop condition in the test policy set by the setting unit 230, the stop determination unit 226 determines whether the status of the base station 2 satisfies a stop condition, and when the status satisfies the stop condition, the stop determination unit 226 causes the test conduct unit 222 to stop the operation test.

The information processing unit 23 (FIG. 2), which includes a CPU and a memory (not illustrated), performs a predetermined information process, and bidirectionally inputs and outputs signals to and from the test control unit 22 and the communication unit 24. For example, the information processing unit 23 performs a process of setting a test policy in the test control unit 22 at the setting unit 230. In addition, the information processing unit 23 compiles, as test result information, the determination result of the operation test input from the test control unit 22, and outputs the information to the communication unit 24 together with base station performance information of the base station 2. The base station performance information is information representing the performance of the radio communication of the base station 2, and includes information such as the number ($m$) of radio communication units 21, the number of the antennas 20, and the compatible communication standard.

The communication unit 24 transmits (notifies), to the control station 3, the base station performance information and the test result information input from the information processing unit 23 by, for example, a wired communication through the network 10 (FIG. 1). In addition, the communication unit 24 outputs, to the information processing unit 23, a test policy transmitted from the control station 3 through the network 10.

It is to be noted that an attenuator may be provided for each antenna 20 of the base station 2, for example. In addition, the radio communication unit 21 may be capable of setting the attenuation value of the attenuator. In this case, for example, when performing radio communication as a virtual terminal station, the radio communication unit 21 can adjust the radio wave attenuation amount between this radio communication unit 21 and a connection-destination radio communication unit 21 in the normal mode. That is, the test pattern of the base station 2 may be expanded such that the operation test is conducted on the assumption that the base station 2 is connected not only from a specific point, but also from a terminal station at a different point.

Figure 4:
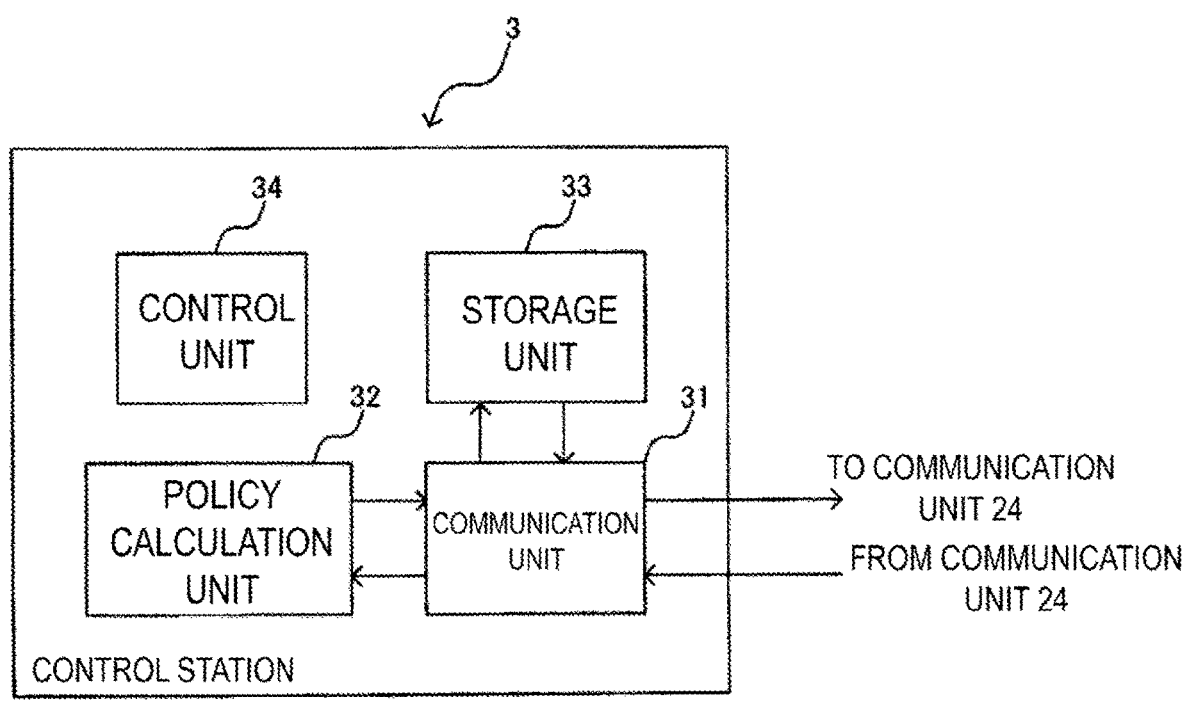
FIG. 4 illustrates an exemplary configuration of a control station.

FIG. 4 illustrates an exemplary configuration of the control station 3. As illustrated in FIG. 4, the control station 3 includes a communication unit 31, a policy calculation unit 32, a storage unit 33 and a control unit 34. It is to be noted that other function blocks that are provided in typical control stations are not illustrated.

The communication unit 31 receives base station performance information from each base station 2 by, for example, a wired communication through the network 10, and outputs it to the policy calculation unit 32. In addition, the communication unit 31 receives test result information from each base station 2, and outputs the information to the storage unit 33 to store therein. In addition, the communication unit 31 transmits (delivers) each information calculated by the policy calculation unit 32 to each base station 2 through the network 10.

The policy calculation unit 32 calculates a test policy for each base station 2 on the basis of the base station performance information input from the communication unit 31, and outputs the calculated test policy to the communication unit 31.

The storage unit 33 is a storage apparatus or the like that stores the test result information input from the communication unit 31.

The control unit 34 controls each unit of the control station 3. For example, the control unit 34 also controls the writing of information to the storage unit 33, the reading of information stored in the storage unit 33 and the like.

Next, a specific example of the test policy is described.

FIG. 5 illustrates an exemplary test policy. As illustrated in FIG. 5, the test policy includes the policy number, the test details, the number of test repetitions, the determination condition, the conduct condition, and the stop condition, for example.

The test details define the details of the operation test conducted by the base station 2, and includes conduct of radio connection, transmission of a test traffic and the like, for example. The number of repetitions is the number of test repetitions in a single operation test. The determination condition is a condition for making a pass/fail determination on a result of the operation test. The determination condition includes the time required to establish a radio connection, the throughput, the traffic packet loss rate, and the like, for example.

The conduct condition is a condition for conducting the operation test. The conduct condition includes the traffic of the base station 2, the number of terminal stations to be connected, the past conduct status of the test and the like. The stop condition is a condition for stopping the operation test that is being conducted. The stop condition includes conditions such as the traffic of the base station 2 and the number of terminal stations to be connected.

FIG. 6 illustrates exemplary test result information. As illustrated in FIG. 6, the test result information includes the base station identifier, the test date and time, the test policy, and the test result. The base station identifier includes information that identifies the base station 2 such as the media access control (MAC) address and the serial number of the base station 2 where the test is conducted. The test policy includes the conducted test policy number.

Next, an exemplary operation of the radio communication system 1 is described.

Figure 7:
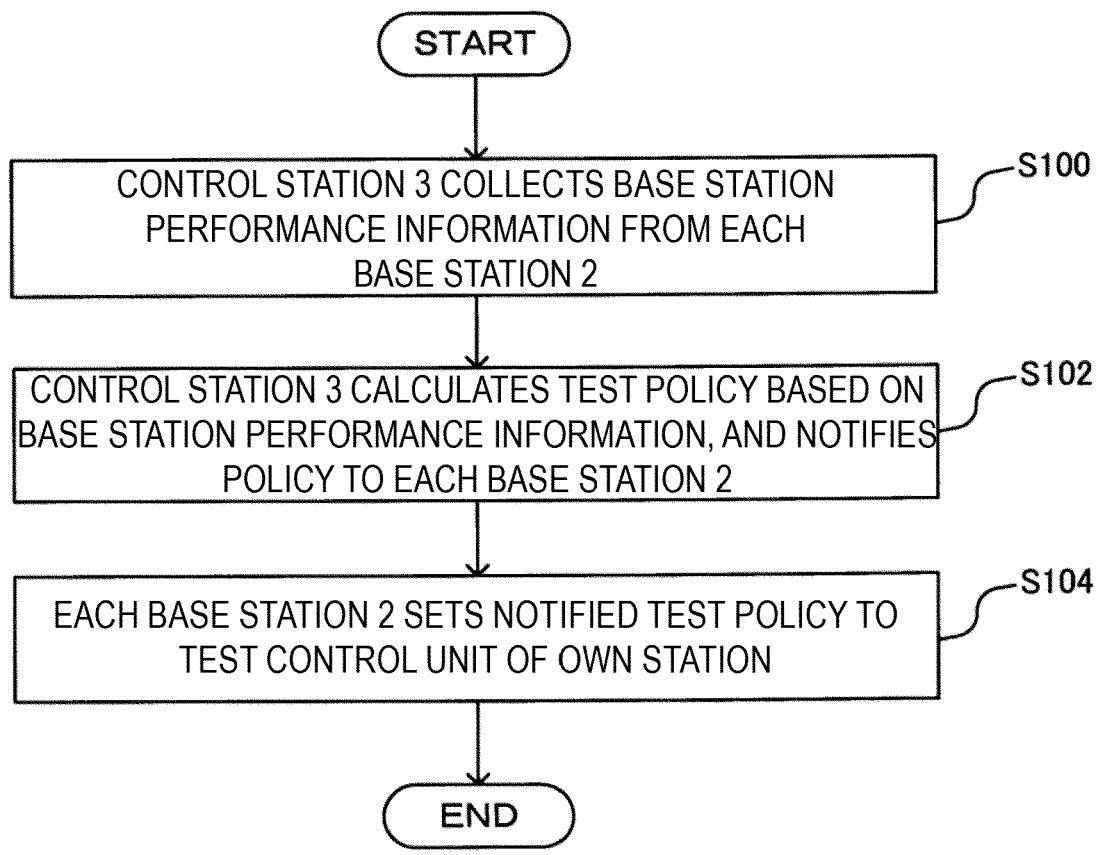
FIG. 7 is a flowchart illustrating an exemplary operation in a case where the radio communication system performs an initial setting for each base station.

FIG. 7 is a flowchart illustrating an exemplary operation of a case where the radio communication system 1 performs an initial setting for each base station 2. First, the control station 3 collects the base station performance information from each base station 2 (S100).

Next, the control station 3 calculates the test policy on the basis of the base station performance information collected from the base station 2, and notifies the policy to each base station 2 (S102).

For example, the control station 3 determines which base station 2 and radio communication unit 21 are to be tested in accordance with the number of the radio communication units 21, the number of the antennas 20, and the compatible communication standard of the base station 2. As the test details, a plurality of test patterns is prepared in advance, for example. In addition, the items (the test details, the number of repetitions, the determination condition, the conduct condition and the stop condition) of the test policy may be set as necessary.

Next, each base station 2 sets the test policy notified from the control station 3 to the test control unit 22 of its own station (S104).

Figure 8:
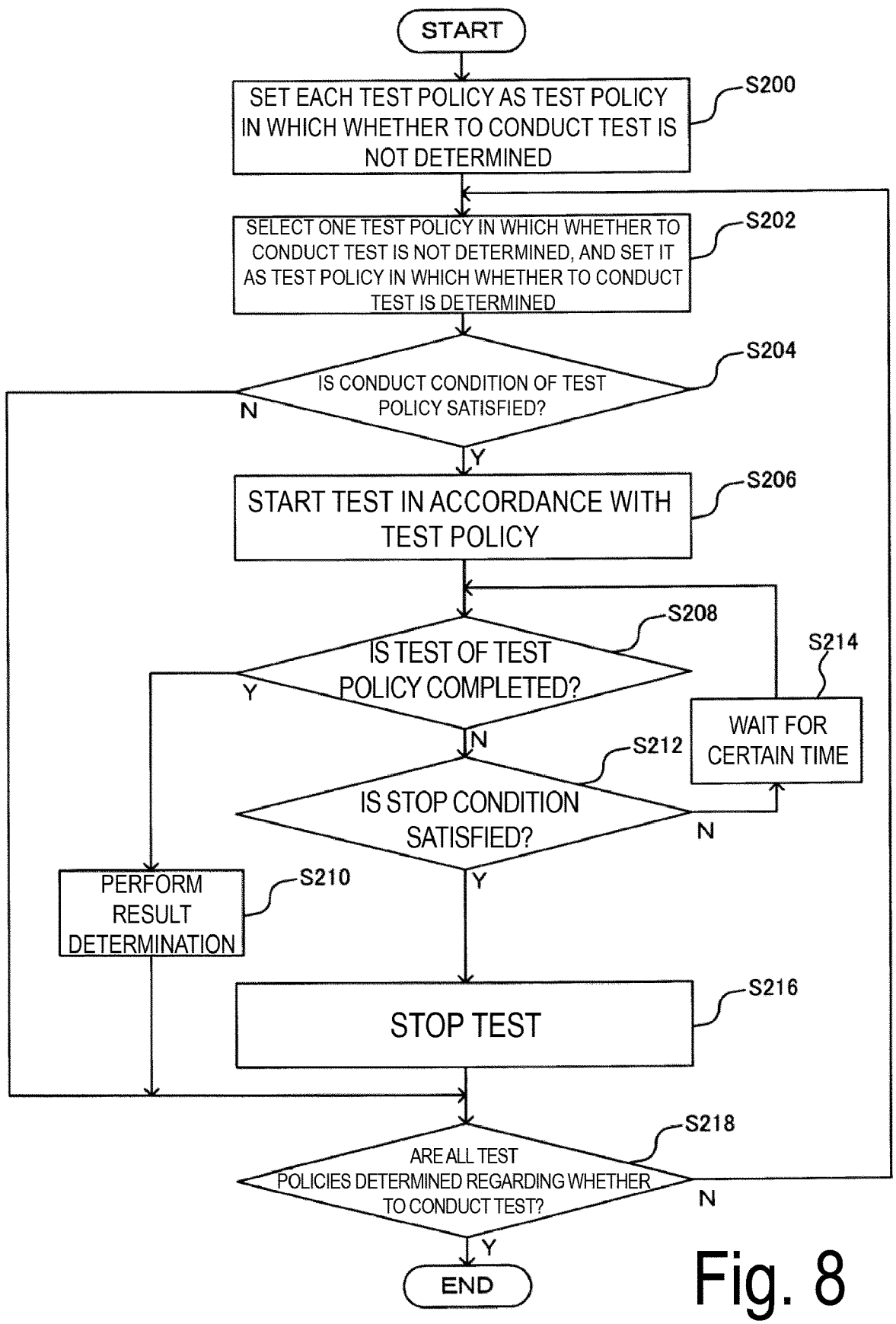
FIG. 8 is a flowchart of an example of an operation test for the base station.

FIG. 8 is a flowchart of an example of an operation test for the base station 2. First, the base station 2 sets each of all test policies in its own station as a test policy in which whether to conduct the test is not determined (S200).

Next, from among the test policies of its own station, the base station 2 selects one test policy in which whether to conduct the test is not determined, and sets the selected policy as a test policy in which whether to conduct the test is determined (S202).

The base station 2 determines whether the status of its own station satisfies the conduct condition of the selected test policy (S204). When the status satisfies the condition (S204: Yes), the base station 2 proceeds to the process of S206, and when the status does not satisfy the condition (S204: No), the base station 2 proceeds to the process of S218.

Then, the base station 2 starts the test in accordance with the selected test policy (S206), and proceeds to the process of S208.

The base station 2 determines whether the test of the test policy has been completed (S208). When the base station 2 determines that the test has been completed (S208: Yes), the base station 2 proceeds to the process of S210, and when the base station 2 determines that the test has not been completed (S208: No), the base station 2 proceeds to the process of S212.

At the process of S210, the base station 2 performs a result determination for the measurement value acquired in the test after completion of the test, and proceeds to the process of S218.

In addition, at the process of S212, the base station 2 determines whether its own station satisfies the stop condition of the selected test policy. When the base station 2 determines that the own station satisfies the condition (S212: Yes), the base station 2 proceeds to the process of S216, and when the base station 2 determines that the own station does not satisfies the condition (S212: No), the base station 2 proceeds to the process of S214.

At the process of S214, the base station 2 waits for a certain period of time, and then returns to the process of S208.

At the process of S216, the base station 2 stops the test of the selected test policy, and proceeds to the process of S218.

Then, the base station 2 determines whether all test policies set in its own station are determined regarding whether to conduct the test (S218). When all test policies are determined regarding whether to conduct the test (S218: Yes), the base station 2 terminates the process, and when all test policies are not determined regarding whether to conduct the test, the base station 2 returns to the process of S202.

As a specific example, the radio communication system 1 performs switching such that a specific radio communication unit 21 is switched to the subordinate mode and another radio communication unit 21 is set to the normal mode, among the plurality of radio communication units 21 that are switchable between a normal mode in which each radio communication unit 21 performs radio communication as a base station and a subordinate mode in which each radio communication unit 21 performs radio communication as a virtual terminal station.

Then, the radio communication system 1 conducts the operation test of the base station 2 by performing radio communication between the specific radio communication unit 21 switched to the subordinate mode and the other radio communication unit 21 in the normal mode on the basis of the test policy that sets the operation test.

In this manner, in the radio communication system 1, each base station 2 periodically conducts the above-described operation test on the basis of the test policy. Thus, each base station 2 autonomously determines the status of the own station, and conducts a required operation test at an appropriate timing.

Accordingly, the radio communication system 1 can conduct the operation test of the base station without the need for a worker to connect terminal stations on site, and eliminates the necessity of personnel work for conducting the operation test of the base station 2. In addition, when conducting the operation test, the radio communication system 1 uses some of the plurality of radio communication units 21 of the base station 2 for the operation test, and thus can conduct the operation test while maintaining the provision of the wireless service. Further, in the radio communication system 1, the base station 2 notifies the test result to the control station 3. Thus, the operator of the radio communication system 1 can readily collect and confirm the test results of the plurality of base stations 2, and the task of confirming the test results can be reduced.

It is to be noted that the base station 2 and the control station 3 in the above-described embodiment may be implemented by a general-purpose computer as well as by a dedicated apparatus. In this case, the base station 2 and the control station 3 may be implemented by recording programs for implementing the functions of the stations in a computer-readable recording medium and causing a computer system to read the program recorded in the recording medium for execution.

Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system.

Further, "computer-readable recording media" may include those that hold the program dynamically for a short period of time, such as communication lines when the program is transmitted over a network such as the Internet or communication lines such as telephone lines, or those that hold the program for a certain period of time, such as a volatile memory inside a computer system that serves as the server or client in that case.

The above-mentioned program may be used to implement some of the above-mentioned functions, and further, the above-mentioned functions may be implemented in combination with a program that is already recorded in a computer system. In addition, the above-mentioned program may be implemented using hardware such as a programmable logic device (PLD) or a field programmable gate array (FPGA).

Although the embodiment of the present invention has been described above with reference to the drawings, it is clear that the above-mentioned embodiment is merely an example of the present invention and that the present invention is not limited to the above-mentioned embodiment.

Therefore, additions, omissions, substitutions, and other modifications of elements may be made insofar as they are within the technical concept and scope of the invention.

REFERENCE SIGNS LIST

1 Radio communication system
2 Base station
3 Control station
10 Network
20 Antenna
21-1 to 21-*m* Radio communication unit
22 Test control unit
23 Information processing unit
24 Communication unit
31 Communication unit
32 Policy calculation unit
33 Storage unit
34 Control unit
221 Conduct determination unit
222 Test conduct unit
223 Switching unit
224 Result determination unit
225 Storage unit
226 Stop determination unit
230 Setting unit

The invention claimed is:

1. An operation test method of a base station to which a plurality of terminal stations are connectable, the method comprising:
switching a setting of a specific radio communication unit of a plurality of radio communication units to a subordinate mode and setting another radio communication unit of the plurality of radio communication units to a normal mode, the normal mode being a mode in which each of the plurality of radio communication units performs radio communication as a base station, the subordinate mode being a mode in which each of the plurality of radio communication units performs radio communication as a virtual terminal station, each of the plurality of radio communication units being switchable between the normal mode and the subordinate mode; and
conducting an operation test of the base station by performing, based on a test policy that sets the operation test, radio communication between the specific radio communication unit in which the setting is switched to the subordinate mode and the other radio communication unit in the normal mode.

2. The operation test method of the base station according to claim 1, wherein each of the plurality of radio communication units is switchable between the normal mode and the subordinate mode compatible with a plurality of communication standards.

3. The operation test method of the base station according to claim 1, further comprising:
calculating the test policy for the base station based on base station performance information representing a performance of the base station; and
delivering the calculated test policy to the base station.

4. The operation test method of the base station according to claim 3, further comprising:
notifying the base station performance information from the base station to a control station;
determining a result of the operation test of the base station; and
notifying the determined result of the operation test of the base station from the base station to the control station, wherein
the control station calculates the test policy.

5. A radio communication system comprising:
a plurality of base stations; and
a control station configured to control each of the plurality of base stations, wherein
each of the plurality of base stations includes:
a plurality of radio communication units, each of the plurality of radio communication units being switchable between a normal mode in which the radio communication unit performs radio communication as a base station and a subordinate mode in which the radio communication unit performs radio communication as a virtual terminal station; and
a test conduct unit configured to conduct an operation test of the base station based on a test policy that sets the operation test of a case where a specific radio communication unit of the plurality of radio communication units is switched to the subordinate mode and another radio communication unit of the plurality of radio communication units operates in the normal mode, and
the control station includes:
a policy calculation unit configured to calculate the test policy for each of the plurality of base stations based on base station performance information representing a performance of each of the plurality of base stations; and
a communication unit configured to deliver the test policy calculated by the policy calculation unit to each of the plurality of base stations.

6. The radio communication system according to claim 5, wherein each of the plurality of radio communication units is switchable between the normal mode and the subordinate mode compatible with a plurality of communication standards.

7. A base station to which a plurality of terminal stations are connectable, the base station comprising:
a plurality of radio communication units, each of the plurality of radio communication units being switchable between a normal mode in which the radio communication unit performs radio communication as a base station and a subordinate mode in which the radio communication unit performs radio communication as a virtual terminal station; and
a test conduct unit configured to conduct an operation test of the base station based on a test policy that sets the operation test of a case where a specific radio communication unit of the plurality of radio communication units is switched to the subordinate mode and another radio communication unit of the plurality of radio communication units operates in the normal mode.

8. The base station according to claim 7, wherein each of the plurality of radio communication units is switchable between the normal mode and the subordinate mode compatible with a plurality of communication standards.

* * * * *